US007342910B2

(12) United States Patent
Mottier et al.

(10) Patent No.: US 7,342,910 B2
(45) Date of Patent: Mar. 11, 2008

(54) METHOD OF ASSIGNING A SPREADING SEQUENCE TO A USER OF A TELECOMMUNICATIONS NETWORK

(75) Inventors: David Mottier, Rennes (FR); Damien Castelain, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 79 days.

(21) Appl. No.: 11/243,983

(22) Filed: Oct. 6, 2005

(65) Prior Publication Data

US 2006/0029012 A1    Feb. 9, 2006

Related U.S. Application Data

(62) Division of application No. 09/624,857, filed on Jul. 24, 2000, now Pat. No. 6,987,747.

(30) Foreign Application Priority Data

Sep. 13, 1999    (EP) .................................. 99402240

(51) Int. Cl.
  *H04B 7/216*    (2006.01)
  *H04J 11/00*    (2006.01)
(52) U.S. Cl. ...................... 370/342; 370/335; 370/203; 370/208
(58) Field of Classification Search .................... None
See application file for complete search history.

(56) References Cited

U.S. PATENT DOCUMENTS

| 5,933,777 | A | * | 8/1999 | Rahman | ..................... 455/450 |
| 6,084,884 | A |   | 7/2000 | Adachi | |
| 6,084,888 | A | * | 7/2000 | Watanabe et al. | ........... 370/473 |

(Continued)

FOREIGN PATENT DOCUMENTS

EP            0837565            4/1998

(Continued)

OTHER PUBLICATIONS

Ochiai et al., "OFDM-CDMA with Peak Power Reduction Based on the Spreading Sequences," IEEE International Conference on Communications, Jun. 7-11, 1998, pp. 1299-1303, vol. 13, XP000888222.

(Continued)

*Primary Examiner*—Chirag G. Shah
(74) *Attorney, Agent, or Firm*—Birch, Stewart, Kolasch & Birch, LLP

(57) ABSTRACT

An apparatus and method for a Multi-Carrier Code Division Multiple Access ("MC-CDMA") transmission network is disclosed. In the MC-CDMA transmission network a plurality of spreading sequences are assigned to individual users from a plurality of predetermined spreading sequences. The spreading sequences are assigned to users in order to minimize the interference created by the assignment of spreading sequences.

11 Claims, 2 Drawing Sheets

U.S. PATENT DOCUMENTS

| | | | |
|---|---|---|---|
| 6,097,712 A * | 8/2000 | Secord et al. | 370/335 |
| 6,278,702 B1 * | 8/2001 | Deane et al. | 370/342 |
| 6,282,185 B1 * | 8/2001 | Hakkinen et al. | 370/342 |
| 6,327,257 B1 * | 12/2001 | Khalifa | 370/342 |
| 6,393,047 B1 * | 5/2002 | Popovic' | 375/140 |
| 6,493,376 B1 * | 12/2002 | Harms et al. | 375/130 |
| 6,510,172 B1 * | 1/2003 | Miller | 375/140 |
| 6,556,551 B1 * | 4/2003 | Schwartz | 370/331 |
| 2006/0215737 A1 * | 9/2006 | Bang et al. | 375/146 |

FOREIGN PATENT DOCUMENTS

WO    WO-99/03224    1/1999

OTHER PUBLICATIONS

Popovic, "Spreading Sequences for Multi-Carrier CDMA Systems," IEEE Colloquium on CDMA Techniques and Applications for Third Generation Mobile Systems, May 19, 1997, pp. 1-6, XP000770002.

* cited by examiner

METHOD OF ASSIGNING A SPREADING SEQUENCE TO A USER OF A TELECOMMUNICATIONS NETWORK

This application is a Divisional of application Ser. No. 09/624,857 filed on Jul. 24, 2000, now U.S. Pat. No. 6,987,747 and for which priority is claimed under 35 U.S.C. § 120; and this application claims priority of Application No. 99402240.8 filed in Europe on Sep. 13, 1999 under 35 U.S.C. § 119; the entire contents of all are hereby incorporated by reference.

BACKGROUND OF THE INVENTION

1. Field of the Invention

The present invention concerns a method of assigning a spreading sequence to a user of a telecommunications network, such as a Multi-Carrier Code Division Multiple Access transmission network, better known by the name MC-CDMA network.

2. Discussion of the Relevant Art

Among the new communication systems making it possible to manage, simultaneously and in one and the same frequency band, a number of communications between distinct users, the Multi-Carrier Code Division Multiple Access transmission technique, better known by the name MC-CDMA technique, is known. This transmission technique combines both the principles of Orthogonal Frequency Division Multiplex transmission known by the name OFDM and those of the Code Division Multiple Access (CDMA) technique.

FIG. 1 depicts a block diagram illustrating an example of the operation of a transmitter using the MC-CDMA transmission technique. This example represents an outgoing route transmission, that is to say from a base station to a mobile station. The n-th data item of the k-th user $d^{(k)}[n]$ is fed to multipliers 10 to 1N-1 respectively provided for multiplying it by the elements $c_m^{(k)}$ (m being between 0 and N-1) of a sequence referred to as a spreading sequence, and then to modulators 20 to 2N-1 for respectively modulating it on sub-carriers at the frequency $(f_c+m.F/T_b)$ where $f_c$ is the original frequency of the transmitted signal and $F/T_b$ is the spacing between two consecutive sub-carriers, F being an integer and $T_b$ being the duration of the data item $d^{(k)}[n]$, excluding a guard interval. All the sub-carriers are added up in an adder 30 to form the transmitted signal $s^{(k)}(n,t)$ which can therefore be expressed in the form:

$$s^{(k)}(n,t) = d^{(k)}[n]\sum_{m=0}^{N-1} c_m^{(k)} \cos\left[2\pi\left(f_c+m\frac{F}{T_b}\right)t\right] \text{ if } t \subset [0, T_b]$$

$$s^{(k)}(n,t) = 0 \text{ otherwise}$$

It should be noted that, in this particular example, the assembly of the modulators 20 to 2N-1 and of the adder 30 can be implemented by an inverse Fourier transform.

It should be noted that, for reasons of clarity, it has been considered that the length N of each spreading sequence is equal to the number M of modulation sub-carriers, which is not necessarily the case in all MC-CDMA systems.

The assumption has also been made, for reasons of clarity, that a single spreading sequence is assigned per user, which is not necessarily the case.

It is known that the propagation channel can be obstructed by houses and other obstacles situated between the transmitter and the receiver. The transmitted signal is then propagated on multiple paths, each path being delayed and attenuated differently. It should be understood that the propagation channel then acts as a filter whose transfer function h(f, t) varies with time.

The contribution denoted $s_m$ to the transmitted signal s(n,t) of each carrier m of data items d intended for K users can be expressed as follows:

$$s_m = \sum_{k=1}^{K} d^{(k)} c_m^{(k)}$$

In view of the complex attenuation denoted $h_m^{(p)}$ induced by the transmission channel at the receiver of the user of rank p, the signal received, in the synchronous case and on the outgoing route, on each sub-carrier of rank m can then be expressed as follows:

$$r_m^{(p)} = h_m^{(p)} \sum_{k=1}^{K} (d^{(k)} c_m^{(k)}) + n_m^{(p)}$$

where $n_m^{(p)}$ represents the sample of additive white Gaussian noise on the carrier of rank m.

The ability of MC-CDMA transmission systems to provide orthogonality between the signals of the different users in the network (and therefore to prevent any interference between these signals) depends on the intercorrelation properties of the spreading sequences which are assigned to the users of the network.

Typically, in the case of transmissions on a mobile radio channel from a base station to a set of mobile stations, the signals intended for each user are transmitted synchronously. Under these conditions, Walsh-Hadamard spreading sequences can be used to guarantee orthogonality between the users if the channel is not frequency selective.

In the known MC-CDMA systems, the assigning of spreading sequences does not, for one and the same family of spreading sequences (Walsh-Hadamard sequences of length N, Gold sequences, etc.), obey precise rules in order that the interference related to the frequency selectivity of the channel is minimized.

However, in actual fact, the present invention is based on the idea that the signal which is received by a receiver of an MC-CDMA system has a component which is related to the interference with the other users, interference which, contrary to what is commonly accepted, depends on the sequences assigned to these users in the same family of sequences used by the transmission system.

This is because, after unspreading, the signal $v^{(p)}$ received by the user p can be expressed in the form:

$$v^{(p)} = \sum_{m=1}^{N} c_m^{(p)} \left[ h_m^{(p)} \sum_{k=1}^{K} (d^{(k)} c_m^{(k)}) + n_m^{(p)} \right]$$

$$= \sum_{m=1}^{N} \left( h_m^{(p)} \sum_{k=1}^{K} (c_m^{(p)} c_m^{(k)} d^{(k)}) + z_m^{(p)} \right)$$

-continued $$= d^{(p)} \sum_{m=1}^{N} h_m^{(p)} + \sum_{k=1, k \neq p}^{K} d^{(k)} \sum_{m=1}^{N} (h_m^{(p)} c_m^{(p)} c_m^{(k)}) + \sum_{m=1}^{N} z_m^{(p)}$$

It is assumed here that $|c_m^{(p)}|^2=1$ and the notation $z_m^{(p)} = n_m^{(p)} \times c_m^{(p)}$ is used.

It should be noted that three contributions are thus revealed in the expression of the signal received by the user p: the desired signal (first term), interference associated with the presence of other users (second term) and noise (third term).

The above relationship can also be written in the form:

$$v^{(p)} = d^{(p)} \sum_{m=1}^{N} h_m^{(p)} + \sum_{k=1, k \neq p}^{K} d^{(k)} I(h, p, k) + \sum_{m=1}^{N} z_m^{(p)}$$

where the term I(h,p,k) is an interference term representing all the interference induced between the two sequences of index p and k, taking into account the frequency selectivity of the channel at the receiver of the user of the sequence of index p and which is therefore equal to $$\sum_{m=1}^{N} h_m^{(p)} c_m^{(p)} c_m^{(k)}.$$

In order to correct the effect of this interference with the other users, implementation is known, at the receiver, of an equalization step whose coefficient of equalization $g_m$ takes a complex value which affects each carrier of rank m so that the apparent transfer function $h'_m^{(p)}$ of the transmission channel seen by the receiver can be written in the form:

$$h'_m^{(p)} = h_m^{(p)} \times g_m$$

The modified interference term I' (h, p, k) resulting from the fact of the distortion brought about by the transmission channel is now written:

$$I'(h, p, k) = \sum_{m=1}^{N} h_m^{(p)} c_m^{(p)} c_m^{(k)}$$

A first simplistic approach to the equalization consists of making the apparent transfer function $h'_m^{(p)}$ equal to 1 in order to completely restore orthogonality. However, this approach is not used since it increases the noise too much, which degrades the performance of the transmission system. In practice, the equalization provides a compromise between the restoration of orthogonality, that is to say the reduction of inter-user interference, and minimization of the effects of the noise. The interference is therefore never totally removed.

The aim of the invention is therefore to propose a method which makes it possible to attenuate the effects of the interference term (the second in the preceding equation) on the performance of the transmission system under consideration.

To that end, the present invention concerns a method of assigning one or more spreading sequences to a user of a Multi-Carrier Code Division Multiple Access transmission network. This method is characterised in that it consists of assigning, to the said user, the said spreading sequence or the said spreading sequences, taking into account a predetermined set of spreading sequences from among a set of possible sequences.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION OF THE INVENTION

In an MC-CDMA transmission system, a user is assigned, either at the instant of the initiation of a call, or during communication, one or more spreading sequences, each element of which, at the transmitter of the system, is multiplied by the data item to be transmitted so as to control a modulator operating on a corresponding sub-carrier as has already been explained in the introduction to the present description.

The present invention consists of assigning this spreading sequence or these spreading sequences, taking into account a predetermined set of sequences, like for example the set of sequences already used, notably by other users at the instant under consideration and/or a set of sequences potentially usable in the future.

It is shown below, by means of a simplified example, that the assigning of sequences according to the present invention makes it possible to optimize the performance of the transmission system.

In this example, two active users are considered so that the received signal $v^{(p)}$ can be expressed as follows:

$$v^{(1)} = d^{(1)} \sum_{m=1}^{N} h_m^{(1)} + d^{(j)} I(h, 1, j) + \sum_{m=1}^{N} z_m^{(1)}$$

in the absence of equalization, and $$v^{(1)} = d^{(1)} \sum_{m=1}^{N} h_m^{(1)} + d^{(j)} I'(h, 1, j) + \sum_{m=1}^{N} z'_m^{(1)}$$

in the presence of equalization, the term $z'_m^{(1)}$ representing the noise on the carrier of rank m having undergone the implemented equalization process.

Figure 1:
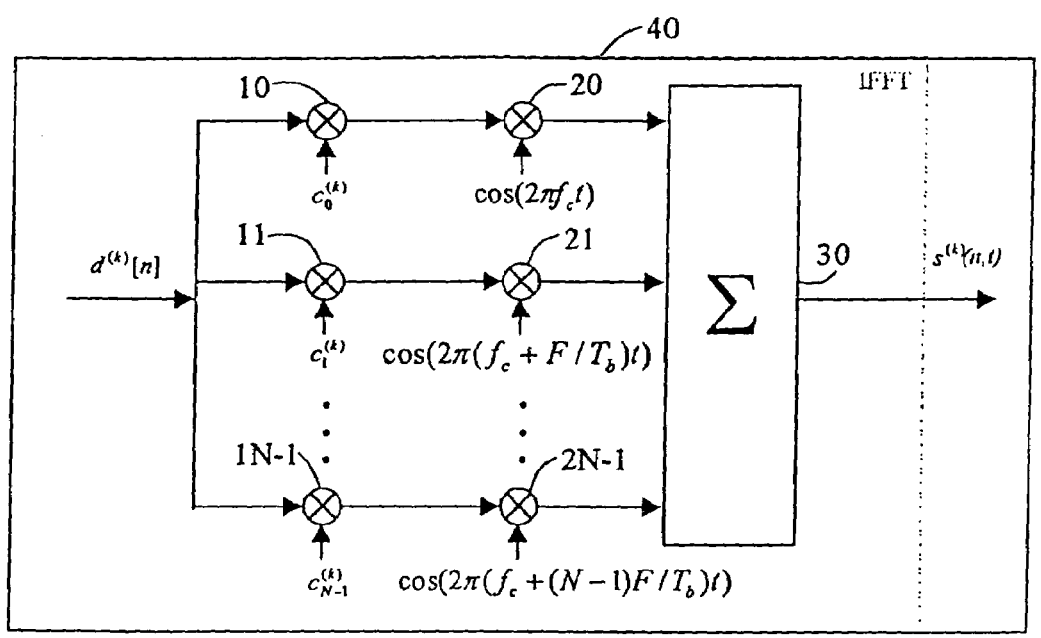
FIG. 1 is a block diagram of an example of a transmitter of an MC-CDMA transmission system.
Figures 2, 3:
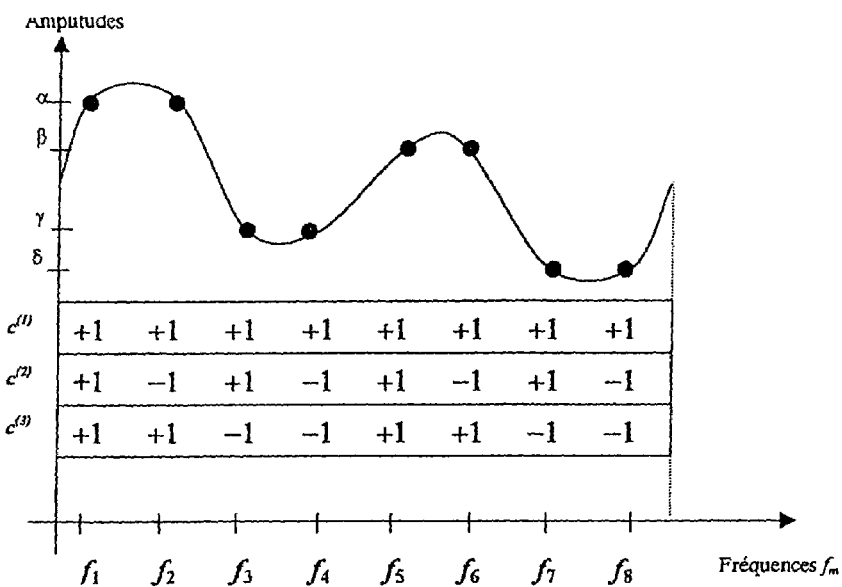
FIG. 2 is an example of a graph showing the amplitude response of a receiver of an MC-CDMA system.
FIG. 3 is a table giving the number of transitions of the element-by-element product of two Walsh-Hadamard sequences of length 8, the said table allowing the illustration of the method of the present invention.

FIG. 2 depicts an example of a spectral amplitude response of a transmission channel of an MC-CDMA transmission system of which the number of sub-carriers $f_1$ to $f_8$ is 8. The amplitudes of the received signals for these frequencies $f_1$ to $f_8$ are respectively $\alpha$, $\alpha$, $\gamma$, $\gamma$, $\beta$, $\beta$, $\delta$ and $\delta$.

The spreading sequence of the user 1 is the following Walsh-Hadamard sequence of length 8:

$$c^{(1)} = (+1, +1, +1, +1, +1, +1, +1, +1)$$

After passing through the channel, whose contribution is assumed here to be limited to its only real component (which consists of considering a perfect equalization of the phase distortion), the impact on the sequence of the user 1 is written:

$$h'^{(1)} c^{(1)} = (+\alpha, +\alpha, +\gamma, +\gamma, +\beta, +\beta, +\delta, +\delta)$$

The sequence $c^{(1)}$ being used and the length of the sequences being 8, 7 other sequences orthogonal to the sequence $c^{(1)}$ remain available.

If it is the sequence $c^{(2)} = (+1, -1, +1, -1, +1, -1, +1, -1)$ which is assigned to the second user, the signal received by the first user is:

$$v^{(1)} = d^{(1)} \sum_{m=1}^{N} h'^{(1)}_m + d^{(2)} \sum_{m=1}^{N} h'^{(1)}_m c^{(1)}_m c^{(2)}_m + \sum_{m=1}^{N} z'^{(1)}_m$$

$$= 2(\alpha + \beta + \gamma + \delta) d^{(1)} + (\alpha \cdot 0 + \beta \cdot 0 + \gamma \cdot 0 + \delta \cdot 0) d^{(2)} + \sum_{m=1}^{N} z'^{(1)}_m$$

$$= 2(\alpha + \beta + \gamma + \delta) d^{(1)} + \sum_{m=1}^{N} z'^{(1)}_m$$

It may be noted that the estimate of the data $d^{(1)}$ of the user 1 does not depend on the data of the second user.

On the other hand, if it is the sequence $c^{(3)} = (+1, +1, -1, -1, +1, +1, -1, -1)$ which is assigned to the second user, the signal received by the first user is:

$$v^{(1)} = d^{(1)} \sum_{m=1}^{N} h'^{(1)}_m + d^{(3)} \sum_{m=1}^{N} h'^{(1)}_m c^{(1)}_m c^{(3)}_m + \sum_{m=1}^{N} z'^{(1)}_m$$

$$= 2(\alpha + \beta + \gamma + \delta) d^{(1)} + 2(\alpha - \beta + \gamma - \delta) d^{(3)} + \sum_{m=1}^{N} z'^{(1)}_m$$

It should then be noted that the estimate of the data $d^{(1)}$ of the user 1 this time depends on the data of the second user.

It is thus shown that, given a propagation channel and a family of spreading sequences with identical intercorrelation properties with no channel degradation, the inter-user interference related to propagation of the signal on multiple paths depends on the choice of spreading sequences used from among this family.

Thus, the choice of a particular sequence depending on those which have already been assigned makes it possible to optimize the performance of the transmission system. But this choice can also be made by taking into account the sequences liable to be used later, thus making it possible to optimize, in the future, the performance of the transmission system.

Assigning of the spreading sequences can be uniform to all users and, in this case, it makes it possible to optimize an average quality of transmission performance for all active users.

On the contrary it can also be non-uniform and, in this case, it makes it possible to optimize the transmission of certain sequences with respect to others, and thus differentiate these sequences, for example in terms of quality of service or some other criterion.

In the case of uniform assigning and according to one characteristic of the present invention, there is assigned to a user, from among all the spreading sequences available at the instant of this assigning, the spreading sequence $c^{(i)}$ which minimizes a function $J^{(j,\Omega_k)}$, referred to as the cost function, representing the interference between the spreading sequence $c^{(i)}$ and the spreading sequences $c^{(k)}$ of a predetermined or given set of sequences whose indices belong to the set of indices $\Omega_k$. Thus, the sequence of rank i is assigned if this rank i verifies the following relationship:

$$i = \arg\min_j \min_{j \in \Omega_j, j \in \Omega_k} \lfloor J^{(j,\Omega_k)} \rfloor$$

where $\Omega_j$ is the set of the indices of the available sequences.

For example, the cost function $J^{(j,\Omega_k)}$ representing the interference between the spreading sequence $c^{(j)}$ and sequences whose indices belong to a set $\Omega_k$ can be defined as being equal to the maximum value taken by a function $D^{(j,k)}$ representing the degradation of the transmission which is induced as a result of the interference between the spreading sequence of index j and the spreading sequence $c^{(k)}$ of indices k, for an index k belonging to the predetermined set $\Omega_k$:

$$J^{(j,\Omega_k)} = \max_{k \in \Omega_k} D^{(j,k)}$$

The cost function could also be equal to the mean of the values taken by this degradation function:

$$J^{(j,\Omega_k)} = \frac{1}{K} \sum_{k \in \Omega_k} D^{(j,k)}$$

where K is the number of indices in the predetermined set $\Omega_k$.

For example, the degradation function $D^{(j,k)}$ is defined as follows:

$$D^{(j,k)} = E\left[\left(\sum_{m=1}^{M} h'^{(j)}_m c^{(j)}_m c^{(k)}_m\right)^2\right] \text{ or }$$

$$D^{(j,k)} = E\left[\left(\sum_{m=1}^{M} h'^{(k)}_m c^{(j)}_m c^{(k)}_m\right)^2\right]$$

where E is the mathematical expectation.

It should be noted here that M is the number of sub-carriers used in the MC-CDMA transmission system and $h'^{(j)}_m$ is either the response of the transmission channel (also denoted $h^{(j)}_m$ in the introduction to the present description), or the apparent response of the transmission channel in view of an equalization process implemented in the receiver, the response for the frequency of the sub-carrier of rank m and for the receiver of the user of the sequence of rank j.

Another possibility is to choose $D^{(j,k)}$ as representing the small size of the high-frequency components of a sequence $\chi^{(j,k)}$ of N elements resulting from the element-by-element product of the sequence $c^{(j)}$ and the sequence $c^{(k)}$. In particular, the more numerous the high-frequency components of this sequence $\chi^{(j,kj)}$, the smaller the degradation function $D^{(j,k)}$.

The size of the high-frequency components compared with the other components can be measured using a Fourier transform.

It can also be measured by considering the number of $\{+1,-1\}$ and $\{-1,+1\}$ transitions appearing in the sequence $\chi^{(j,k)}$. This will then give, for example:

$$D^{(j,k)}=1/T(\chi^{(j,k)})$$

where $T(\chi^{(j,k)})$ is the number of transitions in the sequence $\chi^{(j,k)}$ resulting from the element-by-element product of the sequence $c^{(j)}$ and the sequence $c^{(k)}$.

There is a transition between the m-th element and the m+1-th element of $\chi^{(i,j)}$ if:

$$\mathrm{Sgn}[\chi_m^{(i,j)}] \neq \mathrm{Sgn}[\chi_{m+1}^{(i,j)}]$$

It should be noted that the number of transitions in the product sequences $\chi^{(j,k)}$ is generally known in advance and depends on the family of sequences used by the transmission system: Walsh-Hadamard sequences, Gold sequences, Kasami sequences, etc. This number can be calculated in advance and stored in a memory table for each sequence and for all the product sequences of this sequence.

There will now be illustrated the implementation of the method of the present invention where the cost function $J^{(j,\Omega_k)}$ is equal to the maximum value taken by the degradation function $$\left( J^{(j,\Omega_k)} = \max_{k \in \Omega_k} D^{(j,k)} \right)$$

and the said degradation function is equal to the inverse of the number of transitions in the sequence $\chi^{(j,k)}$ resulting from the element-by-element product of the sequence $c^{(j)}$ and the sequence $c^{(k)}$.

FIG. 3 depicts a table giving respectively along the x and y axes the rank of Walsh-Hadamard sequences and, at the intersection of a line and a column, the number of transitions in the sequence which is the element-by-element product of the two sequences respectively assigned to the said line and to the said column.

Let it be considered for an instant where only the sequences of rank 1 and 6 are used. Determination of the sequence to be assigned to the next user will be carried out by considering a predetermined set equal to the set of the sequences already used. The values of j are therefore equal to 1 and 6. For i=2, the numbers of $T(\chi^{(2,1)})$ and $T(\chi^{(2,6)})$ transitions are respectively equal to 7 and 1. The maximum value of the degradation is therefore 1.

For i=3, the numbers of $T(\chi^{(3,1)})$ and $T(\chi^{(3,6)})$ transitions are respectively equal to 3 and 5. The maximum value of the degradation is therefore ⅓.

For i=4, the numbers of $T(\chi^{(4,1)})$ and $T(\chi^{(4,6)})$ transitions are respectively equal to 4 and 2. The maximum value of the degradation is therefore ½.

The same procedure is carried out for the other values of i. The list of the maximum values of the degradation (or cost) is therefore

| | i | | | | | |
|---|---|---|---|---|---|---|
| | 2 | 3 | 4 | 5 | 7 | 8 |
| $J^{(j,\Omega_k)}$ | 1 | ⅓ | ½ | 1 | ½ | ⅓ |

The spreading sequence for which the value of the cost $J^{(j,\Omega_k)}$ is a minimum is then chosen. Here, two sequences can be chosen: 3 and 8. The choice between the two can be arbitrary or not.

According to the present invention, there is assigned, to each user, at least one spreading sequence so as to take into account the transmission quality envisaged for this sequence or these sequences. The assigning is then referred to as non-uniform.

For example, to a user desiring a good relative transmission quality, there is assigned the spreading sequence $c^{(i)}$ which minimizes the cost function $J^{(j,\Omega_k)}$ with the spreading sequences $c^{(k)}$ of a predetermined or given set of sequences of index k belonging to a set $\Omega_k$. To a user desiring an average transmission quality, there is assigned the spreading sequence $c^{(i)}$ which gives an average value to the cost function $J^{(j,\Omega_k)}$ with the spreading sequences $c^{(k)}$ of a predetermined or given set of sequences of index k belonging to a set $\Omega_k$. As for a user whose transmission quality can be a minimum, there can be assigned the spreading sequence $c^{(i)}$ without worrying about the distortion on this sequence.

According to the present invention, there is assigned to each user at least one spreading sequence so as to take into account the transmission quality envisaged for the sequences belonging to a predetermined set of sequences.

In this case, the predetermined set of spreading sequences $c^{(k)}$ of indices k belonging to a set $\Omega_k$ under consideration at the instant of the assigning of a sequence can be composed of the spreading sequences which are already used at the instant of this assigning.

In this case, given a number K of previously used spreading sequences, the rule for assigning a new sequence consists of allocating, from among the available spreading sequences, the spreading sequence $c^{(i)}$ which minimizes the cost function $J^{(j,\Omega_k)}$ representing the interference between the spreading sequence $c^{(i)}$ and the K already used spreading sequences $c^{(k)}$ of indices k belonging to the set $\Omega_k$.

$$i = \arg\min_{j} \lfloor J^{(j,\Omega_k)} \rfloor \text{ for } K \geq 2$$

The predetermined set of sequences $c^{(k)}$ can also be composed of the spreading sequences which are potentially usable in the future, alone or in combination with the preceding sequences. This may be the case at any instant, but also at the time of the assigning of the first spreading sequence.

The rule for assigning the first spreading sequence consists of allocating, from among the available spreading sequences, the spreading sequence $c^{(i)}$ which minimizes the cost function $J^{(j,\Omega_k)}$ representing the interference between the spreading sequence i and the spreading sequences $c^{(k)}$ potentially usable in the future of indices k belonging to the set $\Omega_k$. The i-th spreading sequence $c^{(i)}$ is assigned if:

$$i = \arg\min_j \lfloor J^{(j,\Omega_k)} \rfloor$$
$$j \in \Omega_j$$

where $\Omega_j$ is the set of the indices of the available sequences.

The rule for assigning a new spreading sequence can also favour the transmission of an already assigned sequence $i_0$. The predetermined set of spreading sequences is then composed of this single sequence.

Thus, given a number K of previously assigned spreading sequences comprising the sequence $c^{(i_0)}$, the rule for assigning a new sequence consists of allocating, from among the available sequences, the spreading sequence $c^{(i)}$ which minimizes the cost function $J^{(i,j_0)}$ representing the interference between the spreading sequence i and the spreading sequence $c^{(i_0)}$ whose transmission it is necessary to favour. The i-th spreading sequence $c^{(i)}$ is assigned if:

$$i = \arg\min_j \lfloor J^{(j,i_0)} \rfloor \text{ for } i_0 \in \Omega, j \neq i_0, K \geq 2$$
$$j \in \Omega_j$$

According to another characteristic of the present invention, the method of the present invention consists of re-assigning during transmission, at given instants, the K-Q sequences still necessary for the different transmissions, K being the number of spreading sequences used previously before Q sequences from among K (Q<K) were made available (for example following the deactivation of a user).

The rules which underlie the re-assigning process are the same as those of the process for assigning to a user at the instant when the latter initiates a communication.

More particularly, this process can be as follows. If K-Q>1, in order to satisfy a re-assigning of the spreading sequences which provides a uniform optimization of the performances, this dynamic re-assigning can consist of:

Calculating the cost functions $J^{(j,\Omega_k)}$ for any spreading sequence $c^{(j)}$ where j belongs to the set $\Omega_Q$ of the indices of the sequences made available.

Calculating the cost functions $J^{(k,\Omega_k)}$ for any spreading sequence $c^{(k)}$ where k belongs to $\Omega_{K-Q}$ of the indices of the sequences still used.

As long as there exists one or more spreading sequences of index $j_0 \in \Omega_Q$ and one or more spreading sequences of index $k_0 \in \Omega_{K-Q}$ such that $J^{(j_0,\Omega_k)} < J^{(k_0,\Omega_k)}$, de-allocating the sequence $c^{(k_M)}$ defined by:

$$k_M = \arg\max_k \lfloor J^{(k,\Omega_k)} \rfloor,$$
$$k \in \Omega_{K-Q}$$

and allocating instead the sequence $c^{(k_m)}$ defined by:

$$k_m = \arg\min_k \lfloor J^{(k,\Omega_k)} \rfloor$$
$$k \in \Omega_Q$$

According to another example, if K-Q>1 and in order to satisfy a re-assigning of the spreading sequences which would favour the transmission of the already assigned sequence $i_0$, the dynamic re-assigning can consist of:

Calculating the cost functions $J^{(j,i_0)}$ for any spreading sequence $c^{(j)}$ where j belongs to the set $\Omega_Q$ of the indices of the sequences made available.

Calculating the cost functions $J^{(k,i_0)}$ for any spreading sequence $c^{(k)}$ where k belongs to $\Omega_{K-Q}$ of the indices of the sequences still used.

As long as there exists one or more spreading sequences of index $j_0 \in \Omega_Q$ and one or more spreading sequences of index $k_0 \in \Omega_{K-Q}$ such that $J^{(j_0,i_0)} < J^{(k_0,i_0)}$, de-allocating the sequence $c^{(k_M)}$ defined by:

$$k_M = \arg\max_k \lfloor J^{(k,i_0)} \rfloor,$$
$$k \in \Omega_{K-Q}$$

and allocating instead the sequence $c^{(k_m)}$ defined by:

$$k_m = \arg\min_k \lfloor J^{(k,i_0)} \rfloor$$
$$k \in \Omega_Q$$

The invention claimed is:

1. A method for assigning spreading sequences to signals of an OFDM transmission network, comprising the steps of:
    establishing a transmission channel that includes a plurality of signals operating on different sub-carrier frequencies;
    assigning at least one spreading sequence from a set of spreading sequences to data items to be transmitted on a signal in order to establish a sub-set of spreading sequences which includes less than all the spreading sequences; and
    minimizing the interference between the spreading sequences by dynamically varying the sub-set of assigned spreading sequences.

2. A method according to claim 1 wherein the signal includes a signal transmitted from the antenna of a wireless OFDM transmission network.

3. A method according to claim 1 wherein the signal includes a signal transmitted from a base station to a mobile station.

4. A method according to claim 1 wherein the signal includes a signal transmitted from a mobile station to a base station.

5. A method according to claim 1 wherein the spreading sequences include Walsh-Hadamard sequences.

6. A method according to claim 1 wherein the spreading sequences include Gold sequences.

7. A method according to claim 1 wherein the spreading sequences include Kasami sequences.

8. A method according to claim 1 wherein a user is assigned to a signal operating on a specified sub-carrier frequency.

9. A method according to claim 1 wherein a cost function is used to minimize the interference.

10. A method according to claim 1 which further includes the step of using equalization to further minimize the interference.

11. A transmitter for an OFDM transmission network, comprising:
  means for generating data items for a user;
  means for multiplying the data items by at least one spreading sequence for each user;
  means for modulating the spread sequenced data items onto a transmission channel that includes a plurality of signals operating on different sub-carrier frequencies;
  wherein the data items of each user are assigned at least one spreading sequence from a set of spreading sequences to establish a sub-set of spreading sequences that are dynamically varied to minimize the interference between the signals operating on the sub-carrier frequencies.

* * * * *